(12) United States Patent
Gundlach et al.

(10) Patent No.: US 7,269,021 B2
(45) Date of Patent: Sep. 11, 2007

(54) SMART CARD CONTAINING A CARRIER BODY FOR RECEIVING AT LEAST ONE SYSTEM COMPONENT HAVING A PLURALITY OF ELECTRICAL COMPONENTS AND UNITING ELECTRICAL FUNCTIONS FOR OPERATING THE SMART CARD

(75) Inventors: Harald Gundlach, Grünwald (DE); Jochen Müller, Wenzenbach (DE)

(73) Assignee: Infineon Techonologies AG, Munich (DE)

( * ) Notice: Subject to any disclaimer, the term of this patent is extended or adjusted under 35 U.S.C. 154(b) by 59 days.

(21) Appl. No.: 10/288,389

(22) Filed: Nov. 5, 2002

(65) Prior Publication Data

US 2003/0073327 A1  Apr. 17, 2003

Related U.S. Application Data

(63) Continuation of application No. PCT/DE01/01112, filed on Mar. 22, 2001.

(30) Foreign Application Priority Data

May 5, 2000 (EP) .................................. 00109645

(51) Int. Cl.
*H05K 1/14* (2006.01)
(52) U.S. Cl. .................. 361/737; 361/777; 361/761; 361/760
(58) Field of Classification Search ............... 361/737, 361/760–761, 740, 777; 439/74–75; 235/492; 174/261, 257
See application file for complete search history.

(56) References Cited

U.S. PATENT DOCUMENTS

| | | | | |
|---|---|---|---|---|
| 5,486,687 A | * | 1/1996 | Le Roux | 235/382 |
| 5,965,867 A | | 10/1999 | Haghiri-Tehrani | |
| 6,188,580 B1 | * | 2/2001 | Huber et al. | 361/737 |
| 6,352,604 B2 | * | 3/2002 | Droz | 156/196 |
| 2004/0211843 A1 | * | 10/2004 | Boker | 235/492 |

FOREIGN PATENT DOCUMENTS

| | | |
|---|---|---|
| DE | 195 26 672 A1 | 1/1997 |
| DE | 197 35 170 A1 | 9/1998 |
| EP | 0 328 124 A2 | 8/1989 |
| EP | 0 481 776 A2 | 4/1992 |
| EP | 0 488 574 A2 | 6/1992 |
| EP | 0 702 325 A2 | 3/1996 |
| EP | 0 706 152 B1 | 4/1996 |
| JP | 61177586 | 8/1986 |
| JP | 62-276659 | 12/1987 |
| JP | 2-204096 | 8/1990 |

* cited by examiner

*Primary Examiner*—Tuan Dinh
*Assistant Examiner*—Hung S. Bui
(74) *Attorney, Agent, or Firm*—Laurence A. Greenberg; Werner H. Stemer; Ralph E. Locher

(57) ABSTRACT

A smart card contains a carrier body for receiving at least one system component, which has (in each case) a plurality of electrical components, and which unites the electrical functions for the operation of the smart card. The system component terminates approximately evenly with the top side of the card body of the smart card. At least one of the electrical components is accessible from the top side of the smart card.

35 Claims, 2 Drawing Sheets

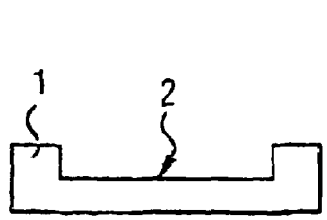
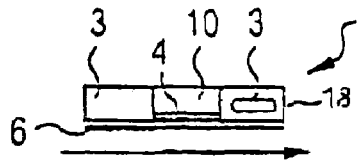
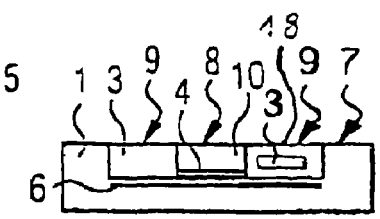
FIG. 1A    FIG. 1B    FIG. 1C
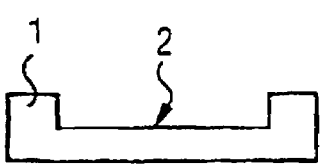
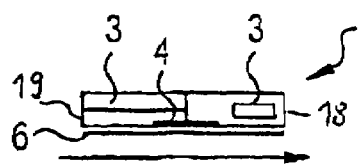
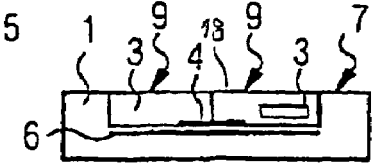
FIG. 2A    FIG. 2B    FIG. 2C
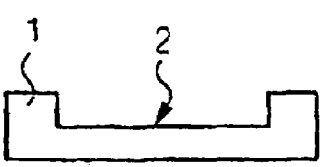
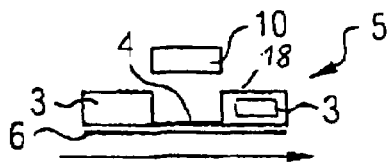
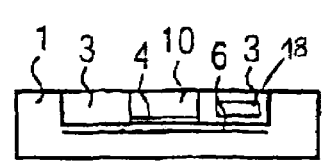
FIG. 3A    FIG. 3B    FIG. 3C
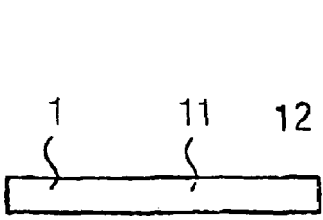
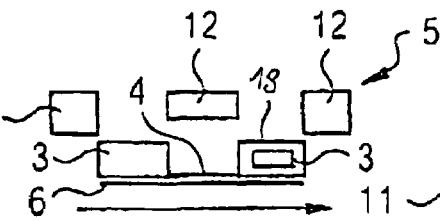
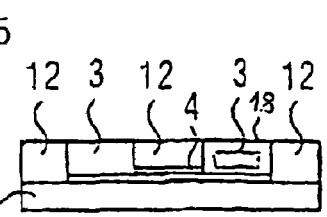
FIG. 4A    FIG. 4B    FIG. 4C
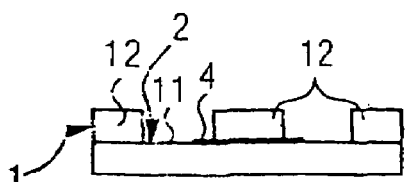
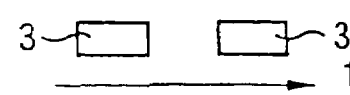
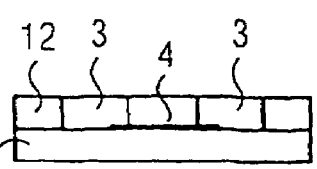
FIG. 6A Prior Art    FIG. 6B Prior Art    FIG. 6C Prior Art

SMART CARD CONTAINING A CARRIER BODY FOR RECEIVING AT LEAST ONE SYSTEM COMPONENT HAVING A PLURALITY OF ELECTRICAL COMPONENTS AND UNITING ELECTRICAL FUNCTIONS FOR OPERATING THE SMART CARD

CROSS-REFERENCE TO RELATED APPLICATION

This application is a continuation of copending International Application No. PCT/DE01/01112, filed Mar. 22, 2001, which designated the United States and was not published in English.

BACKGROUND OF THE INVENTION

1. Field of the Invention

The invention relates to introducing a plurality of components that are electrically connected (forming a system) into a planar carrier, e.g., a smart card. More specifically, the invention relates to a smart card containing a carrier body for receiving at least one system component having a plurality of electrical components and uniting electrical functions for operating the smart card.

The prior art discloses smart cards in which the card body (in each case) has a recess for inserting various components, e.g., a chip module, a display device and an input device. The recesses are provided with electrical terminals which meet electrical terminals of the respective component inserted into the recess. The electrical terminals of different recesses (and thus, the components) can be interconnected via conductor tracks running within the card body.

The card body is often produced from several layers applied one above the other. The conductor tracks are applied on the bottommost layer, for example, by coating and structuring. The electrical components are subsequently applied to the bottommost layer (e.g., by adhesive bonding or soldering), and are electrically connected to the conductor tracks.

Next, at least one further intermediate layer having recesses at the locations of the electrical components is applied to the bottommost layer, and is fixedly connected thereto by adhesive bonding or lamination. A whole-area covering layer (i.e., a layer without any recesses) is applied to the intermediate layer as the topmost layer. Such a structure is described, for example, in EP 0 706 152 B1.

However, one of the disadvantages of the prior art lies in the associated complicated production method (for such smart cards) with correspondingly high costs and tolerances. Furthermore, a functional test of the smart card can only be carried out after all the electrical components have been introduced into the card body. If just a single electrical component is defective, then the inherently finished smart card must be discarded (as a reject), thereby increasing the specific production costs.

EP 0 481 776 A2 discloses a contactless smart card in which the conductor tracks and all of the electrical components (e.g., chips, resistors, capacitors, and antennas) are applied on a tape automated bonding (TAB) carrier. The TAB carrier with the electrical components is encapsulated with a potting compound after a positive electrical functional test. The module surrounded with an encapsulation is inserted into a recess in a carrier body, and is mechanically connected thereto. Finally, a covering is additionally provided on the module.

However, the smart card described in EP 0 481 776 A2 and the aforementioned production method are not suitable for a smart card with contacts or a hybrid smart card, due to the components within such a smart card.

2. Summary of the Invention

It is accordingly an object of the invention to provide a smart card containing a carrier body for receiving at least one system component having a plurality of electrical components and uniting electrical functions for operating the smart card, that overcomes the hereinafore-mentioned disadvantages of the heretofore-known devices of this general type.

Accordingly, the smart card of the invention has contacts or a hybrid operation and has a simpler construction, which enables cost-effective manufacturing.

With the foregoing and other objects in view, there is provided, in accordance with the invention, a smart card having a card body into which at least one system component (which has a plurality of electrical components), which unites electrical functions for operating the smart card (on itself), can be introduced. The system component terminates approximately evenly with the top side of the card body. At least one of the electrical components is accessible from the top side.

In accordance with another feature of the invention, the carrier body includes at least one recess for receiving the at least one system component.

In accordance with a further feature of the invention, the invention provides for a system component which has no electrical connection to the carrier body of the smart card. This is made possible because the various electrical components are integrated in the system component, and are electrically connected to one another to form a system.

Of course, the system component is made larger than an individual component. In other words, instead of inserting individual components into the smart card and electrically interconnecting the individual components via conductor tracks (in the card body), a system component which is integrated together (beforehand)—and which can be electrically checked for its functionality—is inserted into the smart card.

The electrical components may include a chip module with external contacts, an antenna coil, a display device, an input device, an energy store or converter, sensors (e.g., fingerprint sensors), and so on.

Thus, the overall electrical system (containing all of the components necessary for the desired functionality) can advantageously be checked for the electrical functionality (or, can be set in terms of its electrical properties), before the system component is introduced into the carrier body of the smart card.

Accordingly (in the event of a defect of an individual component), only the system component has to be discarded as a reject. No carrier body has to be discarded as a reject, since the mechanical connection to the carrier body does not take place until after the functionality test has been passed. This makes it possible to lower the specific production costs of a smart card.

The testing of the overall electrical system, prior to incorporation into the carrier body, is of particular interest when the mechanical connection of the system component and the carrier body is effected by different companies.

The mechanical connection of the carrier body and the system component can be effected, for example, by adhesive bonding or lamination.

The system component may be prepared in such a way that the individual components, which must be operable or visible, are at the same level as the surface of the system component (within permissible height tolerances). The surface of the system component advantageously terminates at the same level as the surface of the card body (likewise, within permissible height tolerances).

In accordance with an added feature of the invention, it may be necessary to provide at least one of the electrical components with a housing, prior to incorporation in the system component.

In accordance with an additional feature of the invention, it may be necessary to provide at least one of the electrical components with a base, prior to incorporation in the system component.

A covering layer need no longer be provided, since the system component terminates approximately evenly with the top side of the carrier body (within the scope of the permissible tolerances). Thus, the production of the smart card can be simplified. The covering layer can also be omitted, so that the electrical components (such as a chip module, an input device and an energy converter in the form of a solar cell) are naturally accessible from the top side.

The carrier body is provided with at least one recess into which the system component can be introduced, so that the smart card has a construction that is as simple as possible. The size of the recess is adapted to the dimensions of the system component.

Ideally, only a single system component is inserted into the smart card. The electrical components of the system components can then be connected to one another. If an electrical connection of the individual electrical components is not necessary, the latter can also be disposed on several system components, and can be inserted into respective recesses of the carrier body. Alternatively, exactly one recess may be provided for each system component. However, it is also possible to insert several system components, lying directly next to one another, into a correspondingly formed recess.

The carrier body provided with the at least one recess may be formed in one piece. For example, the recess may be milled.

In accordance with yet another feature of the invention, as an alternative, the carrier body may include a base layer (on which the at least one system component is applied), and at least one further layer having a cutout at the locations of the electrical components of the system component. The connection between the base layer and the further layer can be effected in a conventional manner (e.g., by adhesive bonding, lamination, etc.).

In accordance with yet a further feature of the invention, if the electrical components are located directly next to one another (i.e., without an interspace), then the further layer is formed as a peripheral frame.

In accordance with yet an added feature of the invention, if the electrical components of the system component are located in a spaced apart manner from one another, then there exists an interspace between them, and the interspace is closed by a gap-filler. The gap filler advantageously contains the same material as the base layer and the further layer. The gap filler may be a part of the further layer, so that the further layer has recesses at the locations of the electrical components.

In accordance with yet an additional feature of the invention, the electrical components of a system component are advantageously applied on a baseplate having conductor tracks.

In accordance with again another feature of the invention, the conductor tracks may serve as the electrical connection for the electrical components (applied on the baseplate), and may also be a part of an antenna coil for wire-free data exchange.

As compared with conventional smart cards, it is possible in the present invention to increase the precision during the application or positioning of the conductor tracks on the baseplate, since it is possible to use the tools for the production of customary printed circuit boards. Therefore, printed circuit boards, in particular flexible printed circuit boards (e.g., containing FR4), can be appropriate as baseplates of the system component.

The requirements of an extremely exact lamination process of the conductor tracks (which are usually embodied on an inlay), and the requirements necessary in the production of the conventional smart cards, are no longer required in the carrier body of the smart card. Therefore, more contacts or smaller contact areas can be used on the base body of the system component.

Customary "printed circuit board automatic placement" machines can be used for placement of the system component. The machines are able to operate in a highly optimized manner with favorable costs.

In accordance with again a further feature of the invention, the baseplate itself may have one or more recesses for receiving the semiconductor chips. This makes it possible to comply with the requirement of a plane topside of the smart card, if the electrical component would otherwise have an excessively large height.

In accordance with a concomitant feature of the invention, the electrical components are located directly adjacent one another.

Other features which are considered as characteristic for the invention are set forth in the appended claims.

Although the invention is illustrated and described herein as embodied in a smart card containing a carrier body for receiving at least one system component having a plurality of electrical components and uniting electrical functions for operating the smart card, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIGS. 1A to 4C are diagrammatic side elevational views of different configurations of carrier bodies of a smart card and respective system components;

FIGS. 6A-6C are diagrammatic side elevational views of a conventional configuration of a card body and individual components of a smart card.

DESCRIPTION OF THE PREFERRED EMBODIMENTS

Figure 5:
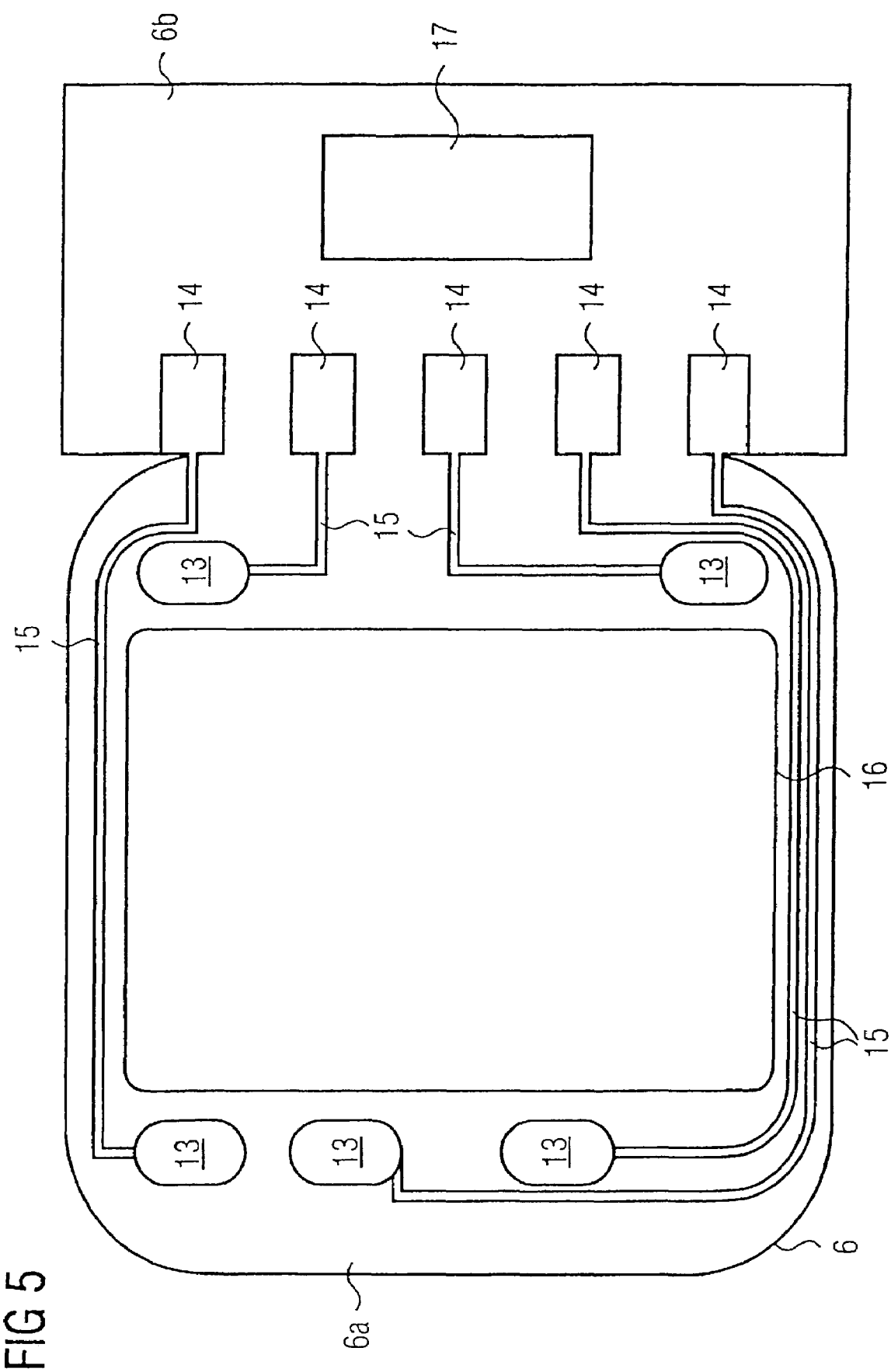
FIG. 5 is a plan view of an exemplary baseplate for use in the smart card according to the invention.

Referring now to the figures of the drawings in detail and first, particularly to FIGS. 1A to 4C thereof, there are shown different embodiments of the invention. The cross sections shown in the figures are not illustrated according to scale. For simplicity, in general, FIGS. 1A-1C will be referred to as FIG. 1, FIGS. 2A-2C will be referred to as FIG. 2, FIGS. 3A-3C will be referred to as FIG. 3, FIGS. 4A-4C will be referred to as FIG. 4, and FIGS. 6A-6C will be referred to as FIG. 6.

In accordance with FIGS. 1, 2 and 3, a card body 1 containing one piece or a plurality of layers has a recess 2. The recess 2, which may not have any electrical contacts, serves for receiving a system component 5. The system component 5 has various components 3 on a baseplate 6.

Examples of the components include a chip module with contact areas for external contact-connection, a display device, an input device, an antenna coil for contactless data transmission, and further non-illustrated components. The components present on the system component 5 may be electrically interconnected via conductor tracks 4 applied on the baseplate 6. The baseplate 6 may be a printed-circuit-board carrier, e.g., a flexible printed circuit board containing FR4.

If a space exists between different electrical components 3 (as illustrated in FIGS. 1 and 3), then the space is closed with a gap-filler 10. The gap-filler 1 preferably contains the same material as the carrier body. The gap filler 10 can be applied to the baseplate 6 at the same time as the electrical components 3. See FIG. 1. It can also be applied to the baseplate 6 after the application of the electrical components See FIG. 3. In any event, the gap filler 10 terminates with its top side 8 approximately even with the top sides 9 of the electrical components 3 (within the scope of permissible tolerances).

In FIGS. 1 and 3, the electrical components 3 are in each case located in an edge-region of the baseplate 6. However, this exemplary embodiment constitutes only one of many possibilities. The electrical components could also be turned to an inner region of the baseplate 6 to a greater extent, so that a free, complete or partial peripheral edge arises on the baseplate. The gap filler 10 could also be formed as a layer, which is adapted to the size of the baseplate 6, and which contains recesses at the locations of the electrical components 3.

FIG. 2 shows an alternative exemplary embodiment, in which the electrical components directly abut one another, so that there is no interspace. In this case, the baseplate 6 is adapted to the overall size or dimensions of the electrical components 3. The electrical components 3 disposed next to one another on the baseplate 6 are likewise matched to one another in terms of their height. Therefore, it may be necessary for some or all of the electrical components 3 to be accommodated in a housing 18 (e.g., containing a potting compound) in order to compensate for height differences. It may also be necessary to provide at least one of the electrical components with a base 19, prior to incorporation in the system component.

In all of the embodiments shown, it is conceivable that the baseplate has recesses (not illustrated in FIGS. 1 to 4), at the locations of the electrical components 3, into which a semiconductor chip can extend with or without a housing 18.

The maximum height of the baseplate with the electrical components 3 situated thereon must not exceed a height of approximately 700 μm, so that the standardized height of 800 μm (in the case of smart cards) is not exceeded.

After the positive electrical functional test, the system component 5 is introduced into the recess 2 of the card body and is mechanically fixedly connected thereto. The connection can be effected by lamination, adhesive bonding or any other suitable connecting technique.

It is conceivable to combine electrical components to form functional units and to produce them as a system component. Consequently, the components which require an electrical connection are realized in a system component. It is possible to equip a card body with several system components. The system components can be introduced into a single recess 2 of the card body, or (in each case) can be positioned in a dedicated recess. However, it is still possible, for the combined components to form a functional unit, to be checked for electrical functionality prior to mounting the card body.

The carrier body of the smart card may not necessarily have a recess, in contrast to the illustrations shown in FIGS. 1 to 3. In accordance with the exemplary embodiment of FIG. 4, the carrier body may have a plane base layer 11. The system component 5 can be adapted in its dimensions to the area of the card body, and can be connected to even (i.e., at the same level) with the edges.

If (as shown in FIG. 4) the lateral dimensions of the system component are smaller than that of the base layer 11, then the edge that remains free is filled with one or more further layers having a cutout for the system component. This additionally fixes the system component applied on the base layer 11. This multilayer construction is conventional, except for the height-adapted system component for termination with the surface.

Accordingly, the invention affords the advantage that an electrical functional test can be performed prior to connecting the system component 5 with the base layer 11.

The further layer 12 could also be formed as a peripheral layer, while the interspace between the electrical components 3 is closed by a separate gap filler 12.

As illustrated on the right-hand side of FIGS. 1 to 4, the system component and the top side 7 of the carrier body 1 terminate even with one another (within the scope of the permissible tolerances) after the step of mechanical connection. Thus, it is possible to avoid a covering layer on the further layer 12.

FIG. 5 shows a plan view of an exemplary configuration of a baseplate 6, which is provided for receiving a conventional chip module and a display device. The baseplate 6 has two regions 6a, 6b. The region 6a is provided for receiving the chip module and is adapted to the dimensions thereof. The region 6b serves for receiving and making electrical contact with the display device. The region 6b can, but need not, be adapted to the dimensions of the display device.

In this embodiment, the baseplate 6 is configured in such a way that the two electrical components are located directly next to one another.

The region 6a has a recess 16, which serves for receiving the semiconductor chip of the chip module. In the present exemplary embodiment, it is assumed that the display device also has a semiconductor chip, which likewise extends into a recess 17 in the region 6b.

Each region 6a, 6b is provided with contact pads 13 and 14, respectively, which are electrically connected to one another via conductor tracks 15. The contact pads 13, 14 are situated at locations at which they meet correspondingly formed electrical contacts of the chip module and of the display device, respectively.

Accordingly, the chip module and the display device or the respective semiconductor chips are electrically connected to one another. The electrical connection between the contact pads 13, 14 can be effected in a conventional manner (e.g., by solder balls, conductive adhesives, etc.).

As can readily be seen from FIG. 5, the baseplate 6 need not necessarily have a rectangular form. Rather, it may be individually adapted to the electrical components to be positioned thereon.

FIG. 6 shows a conventional configuration in which the carrier body 1 has several cutouts 2. Each of the cutouts 2 receives an electrical component which is connected to electrical terminals in the recess 2. An electrical connection is produced between the components 3 via conductor tracks 4 provided in the card body 1.

The card body 1 usually includes a plurality of layers disposed one above the other. The conductor tracks 4 are applied on the bottommost plane layer. One or more further layers provided with the recess 2 is/are applied on the plane layer only after the application of the conductor tracks 4. Next, the electrical components 3 are introduced into the recesses and are electrically connected to the conductor tracks 4.

It is also customary firstly to apply the electrical components 3 on the bottommost layer and to produce the electrical connection, and then to apply the further layer (with the recesses at the locations of the electrical components) to the bottommost layer.

An electrical functional test is possible only at this stage. In the case of a defective component, the entire smart card must be rejected. Moreover, a non-illustrated covering layer (in FIG. 6) is generally necessary in order to obtain a plane surface of the smart card.

We claim:

1. A smart card, comprising:
   at least one system component having a plurality of electrical components for uniting electrical functions for operating the smart card;
   a carrier body having a top aide for receiving said at least one system component; and
   a baseplate having conductor tracks, said plurality of electrical components being applied on said baseplate and electrically interconnected by said conductor tracks;
   at least one of:
   (i) said at least one system component having a surface terminating substantially evenly with said top side of said carrier body and said plurality of electrical components being at the same level as said surface of said at least one system component, and
   (ii) at least one of said plurality of electrical components being accessible from said top side;
   said carrier body including at least one recess for receiving said at least one system component; and
   said system component not being connected to electrical contacts in said carrier body.

2. The smart card according to claim 1, wherein said carrier body includes:
   a base layer for applying said at least one system component thereon; and
   at least one further layer having a cutout at given locations of said plurality of electrical components of said system component.

3. The smart card according to claim 1, wherein said plurality of electrical components are located directly adjacent one another and abut one another.

4. The smart card according to claim 1, further comprising:
   a gap filler, said plurality of electrical components being spaced apart from one another by a respective interspace filled with said gap filler, said gap filler terminating with its top side approximately even with said top side of said electrical components.

5. The smart card according to claim 1, wherein said baseplate has recesses for receiving parts of said electrical components.

6. The smart card according to claim 1, wherein at least one of said plurality of electrical components is surrounded by a housing in causing a height of at least one of said plurality of electrical components to match a height of others of said plurality of electrical components.

7. The smart card according to claim 1, wherein at least one of said plurality of electrical components is fixed on a base prior to incorporation in said system component.

8. A smart card, comprising:
   at least one system component having a plurality of electrical components for uniting electrical functions for operating the smart card;
   a carrier body having a top side for receiving said at least one system component; and
   a baseplate having conductor tracks, said plurality of electrical components being applied on said baseplate and electrically interconnected by said conductor tracks;
   said at least one system component, having a surface terminating substantially evenly with said top side of said carrier body and said plurality of electrical components forming part of said surface of said at least one system component;
   said carrier body including at least one recess for receiving said at least one system component; and
   said system component not being connected to electrical contacts in said carrier body.

9. The smart card according to claim 8, wherein at least one of said plurality of electrical components is accessible from said top side.

10. The smart card according to claim 8, wherein said carrier body includes:
    a base layer for applying said at least one system component thereon; and
    at least one further layer having a cutout at given locations of said plurality of electrical components of said system component.

11. The smart card according to claim 8, wherein said plurality of electrical components are located directly adjacent one another and abut one another.

12. The smart card according to claim 8, further comprising:
    a gap filler, said plurality of electrical components being spaced apart from one another by a respective interspace filled with said gap filler, said gap filler terminating with its top side approximately even with top sides of said plurality of electrical components.

13. The smart card according to claim 8, wherein said baseplate has recesses for receiving parts of said electrical components.

14. The smart card according to claim 8, wherein at least one of said plurality of electrical components is surrounded by a housing causing a height of at least one of said plurality of electrical components to match a height of others of said plurality of electrical components.

15. The smart card according to claim 8, wherein at least one of said plurality of electrical components is fixed on a base prior to incorporation in said system component.

16. A smart card, comprising:
    at least one system component having a plurality of electrical components for uniting electrical functions for operating the smart card;
    a carrier body having a top side for receiving said at least one system component; and a baseplate having conductor tracks, said plurality of electrical components being applied on said baseplate and electrically interconnected by said conductor tracks;

at least one of said plurality of electrical components being accessible from said top side;

said carrier body including at least one recess for receiving said at least one system component; and said system component not being connected to electrical contacts in said carrier body.

17. The smart card according to claim 16, wherein said at least one system component terminates substantially evenly with said top side of said carrier body.

18. The smart card according to claim 16, wherein said carrier body includes:
   a base layer for applying said at least one system component thereon; and
   at least one further layer having a cutout at given locations of said plurality of electrical components of said system component.

19. The smart card according to claim 16, wherein said plurality of electrical components are located directly adjacent one another and abut one another.

20. The smart card according to claim 16, further comprising:
   a gap filler, said plurality of electrical components being spaced apart from one another by a respective interspace filled with said gap filler, said gap filler terminating with its top side approximately even with said top side of said electrical components.

21. The smart card according to claim 16, wherein said baseplate has recesses for receiving parts of said electrical components.

22. The smart card according to claim 16, wherein at least one of said plurality of electrical components is surrounded by a housing causing a height of at least one of said plurality of electrical components to match a height of others of said plurality of electrical components.

23. The smart card according to claim 16, wherein at least one of said plurality of electrical components is fixed on a base prior to incorporation in said system component.

24. A smart card, comprising:
   at least one system component having a plurality of electrical components for uniting electrical functions for operating the smart card;
   a carrier body having a top side for receiving said at least one system component; and
   a baseplate having conductor tracks, said plurality of electrical components being applied on said baseplate and electrically interconnected by said conductor tracks;
   said at least one system component terminating substantially evenly with said top side of said carrier body;
   at least one of said plurality of electrical components being accessible from said top side;
   said carrier body including at least one recess for receiving said at least one system component; and
   said system component not being connected to electrical contacts in said carrier body.

25. A smart card, comprising:
   at least one system component having a top side and a plurality of electrical components for uniting electrical functions for operating the smart card;
   a carrier body having a top side for receiving said at least one system component;
   at least one of said plurality of electrical components being accessible from said top side;
   said electrical components accessible from said top side being matched to one another in terms of their height causing them to terminate approximately flush with said top side of said system component; and
   said top side of said system component terminating approximately flush with said top side of said carrier body.

26. The smart card according to claim 25, wherein said carrier body has at lease one recess into which said system component can be introduced.

27. The smart card according to claim 26, wherein at least one system component having in each case a plurality of electrical components can be introduced into each recess, said system components are not in direct electrical contact with said carrier body.

28. The smart card according to claim 25, wherein said carrier body includes a base layer, on which said at least one system component is applied, and at least one further layer having a cutout at given locations of said plurality of electrical components of said system component.

29. The smart card according to claim 28, wherein said system component has a baseplate having conductor tracks on which the electrical components are applied.

30. The smart card according to claim 29, wherein said electrical components are electrically connected to one another via said conductor tracks.

31. The smart card according to claim 29, wherein said baseplate has recesses for receiving parts of said electrical components.

32. The smart card according to claim 25, wherein said electrical components are located directly next to one another and abut one another.

33. The smart card according to claim 32, wherein at least some of said electrical components of said system component may be surrounded by a housing causing a height of at least one of said plurality of electrical components to match a height of others of said plurality of electrical components.

34. The smart card according to claim 25, wherein said electrical components are spaced apart from one another and a respective interspace thereof is filled with a gap filler, said gap filler terminating with its top side approximately even with said top side of said electrical components.

35. The smart card according to claim 34, wherein at least some of said electrical components of said system component may be surrounded by a housing causing a height of at least one of said plurality of electrical components to match a height of others of said plurality of electrical components.

* * * * *